United States Patent [19]
Breslow

[11] 3,794,899

[45] Feb. 26, 1974

[54] SERVO MOTOR DRIVEN ENCODER ERROR EVALUATION SYSTEM

[75] Inventor: Donald H. Breslow, Framingham Center, Mass.

[73] Assignee: Itek Corporation, Lexington, Mass.

[22] Filed: June 19, 1972

[21] Appl. No.: 263,886

[52] U.S. Cl............. 318/602, 318/314, 318/329, 324/71, 324/186
[51] Int. Cl. ........................................ G05b 19/28
[58] Field of Search... 318/310, 311, 314, 318, 328, 318/329, 333, 601, 602; 324/71, 186

[56] References Cited
UNITED STATES PATENTS 3,465,223 9/1969 Mears ............................ 318/329 X 3,654,479 4/1972 Catherin ........................ 318/314 X Primary Examiner—T. E. Lynch
Attorney, Agent, or Firm—Homer O. Blair; Robert L. Nathans; William C. Roch

[57] ABSTRACT

Disclosed is a system for evaluating errors in high precision encoders. A phase-lock servo system provides accurate and constant shaft speed control of an encoder under test and integration capability is provided to average either angle or time readings obtained during a plurality of revolutions of the encoder and thereby reduce the random errors originating in the testing apparatus. Also provided is a speed perturbation generator for checking the system's operability.

22 Claims, 3 Drawing Figures

SERVO MOTOR DRIVEN ENCODER ERROR EVALUATION SYSTEM

BACKGROUND OF THE INVENTION

This invention relates generally to encoders and more particularly to a system for testing and evaluating errors in high precision encoders.

Optical encoders are widely used for such functions as analog to digital conversion of radar shaft angles for computer inputs. As technology advances, the demands made of encoders become more rigorous, and an ever increasing number of measurement points are required on each encoder disc. Furthermore, an increasing accuracy is required for the distribution of these points. Originally, encoders were tested by a limited point to point comparison with a standard polygon and autocollimator. However, with current demands for precision measurements, limited point to point comparisons fail to yield meaningful results.

Presently, most encoders are tested by either autocollimators and polygons or else by measuring the time required to traverse a specific angle as indicated by the calibrations on the encoder while rotating at a nominally constant speed. A tachometer system is usually used to provide speed regulation. However, some encoders today require that the error be less than 0.01 percent, and as a general rule the equipment used for calibration and checking should allow a safety factor of three, or the accuracy of the error evaluation system should be in the order of 0.0033 percent. Even the best dc tachometers are subject to dc drift and torque fluctuations and are not capable of reducing shaft speed error to less than approximately 0.1 percent. Thus, the desired measurement accuracy requires either better speed regulation, or a system that does not depend on precise speed control. However, systems of the latter type include those employing reflective polygons, but such systems are not practical for high data rates since they require manual operation.

The object of this invention, therefore, is to provide for evaluating encoder errors an automatic system that provides high speed operation on a large number of data points and exhibits a system error level in the order of less than 0.0033 percent.

SUMMARY OF THE INVENTION

This invention is characterized by a phase-lock servo system that is responsive to a reference input signal and rotates an encoder under test at nominally constant speed. The encoder under test provides an output signal which is used for both feedback control and evaluation. The advantage of a phase-lock servo is that the long term average accuracy of the speed control approaches the accuracy of the frequency control of the input signal although transient perturbations or momentary torque fluctuations may cause a small temporary change in speed, the servo compensates for these changes and maintains the system in phase with the reference input signal. Precise shaft average speed control permits shaft angle and shaft angle changes to be conveniently measured in terms of time required to rotate through a specific angle.

A feature of the invention is the combination of two shaft angle detectors and a clock. The detectors define an angular test segment and automatically start and stop the clock as the encoder rotates through the test segment. Since the average shaft speed in known, the error, or difference between the angle as indicated by the calibrations on the encoder and the actual angle as indicated by the measured time, can easily be determined, and improved by multiple measurement averaging.

One more feature is the utilization of a high inertia servo system. Speed regulation of a phase-lock servo system is provided by sampling the outout, but the output of this servo will contain minor perturbations caused by the error in the calibrations of the encoder. A high inertia system will not follow individual encoder errors in the output signal but will respond only to a longer average encoder output and the error of the average output of any encoder approaches zero. The servo system therefore will not follow and thereby hide individual errors in the encoder.

Another feature of the invention is a correlator that adds to the credibility of the error evaluation system by demonstrating that the servo system is not following individual encoder errors. The reference input signal is correlated with the transducer output signal and if the servo system were responding to the individual encoder errors the two signals would be equal. However, minor errors due to encoder calibration are reflected as small phase shifts in the transducer output, and cause temporary perturbations in the output signal of the correlator. Therefore, the output of the correlator is a constant level with white noise superimposed thereon, each transient perturbation giving rise to the white noise resulting from an error on the encoder that is not followed by the servo system. Thus, the correlator shows that the servo system does not compensate for encoder error.

Still another feature of the invention is a perturbation generator that further adds to the credibility of the system. The perturbation generator operates within the bandwidth of the servo and applies a known error signal to the reference input. With the addition of the perturbation signal, the correlation of the reference input signal and the encoder output signal yields an output with three components. Present are a constant level and a white noise component as previously described, and superimposed thereon is a varying level proportional to the perturbation signal, thereby showing that the servo is following the perturbation signal.

Yet another feature of the invention is the utilization of a highly accurate crystal oscillator as a reference input frequency generator. The phase-lock servo system follows the input frequency, and precision crystal oscillators are made with accuracies of one part in $10^{12}$, therefore the speed control of the phase-lock servo system approaches one part in $10^{12}$.

Another feature of the invention is an integrator that averages the times measured during a plurality of traversals of the angular test segment, thereby further increasing the accuracy of the system. Increased accuracy results because minor torque variations may temporarily perturb the shaft speed and cause error in an individual traversal, but because the long term average error of shaft speed approaches one part in $10^{12}$, the average error caused by these perturbations approaches one part in $10^{12}$.

Another feature of the invention is the provision of a clock that produces a digital timing signal so as to permit a digital readout of test results, and the utilization of digital techniques in error evaluation.

Still another feature of the invention is the utilization of a high precision crystal oscillator as a clock to measure the time elapsed during each traversal of the angular test segment. The accuracy of the oscillator can approach one part in $10^{12}$ thereby providing a very stable and accurate counting signal to reduce error in the evaluation system. Furthermore, a crystal oscillator clock may be operated at high frequencies to produce several thousand pulses during traversal of the smallest angular test segment of interest. Quantization error is thereby eliminated as a practical consideration.

Another feature of the invention is the provision of a comparator in the system to automatically evaluate error by comparing the measure variable to a predetermined theoretical value. This technique reduces the magnitude of the numbers used in data reduction.

A feature of another preferred embodiment of the invention is the inclusion of a plurality of pairs of angular position sensors, each pair defining and detecting an independent angular test segment and each pair associated with a clock. Angular test segments may then be chosen from all portions of the encoder and each angular test segment will be measured by a separate clock during each revolution of the encoder. Therefore many test segments may be measured simultaneously, substantially reducing the time required to test an encoder. This is advantageous because long term average error of any encoder approaches zero so meaningful results can only be obtained from relatively small (approximately 2°, for example) test segments and in order to test widely dispersed sections of the encoder many segments are necessary.

Another preferred embodiment of the invention combines one angular position sensor, one interval timer and one angular position recorder. During operation of this embodiment the timer is automatically started, and at the expiration of a precise time interval the angular position as indicated by the output of the encoder is recorded. This recorded position is then compared to the theoretical angular position as computed from shaft speed and the length of the time interval. In this embodiment shaft position is the measured variable to determine error, as time is the variable measured in the previously described embodiment. Either embodiment may be used depending upon which variable is more conveniently measured and evaluated in the system of data reduction being used.

DESCRIPTION OF THE DRAWINGS

These and other features and objects of the invention will become more apparent upon a perusal of the following description taken in conjunction with the accompanying drawings wherein.

DESCRIPTION OF THE PREFERRED EMBODIMENT

Figure 1:
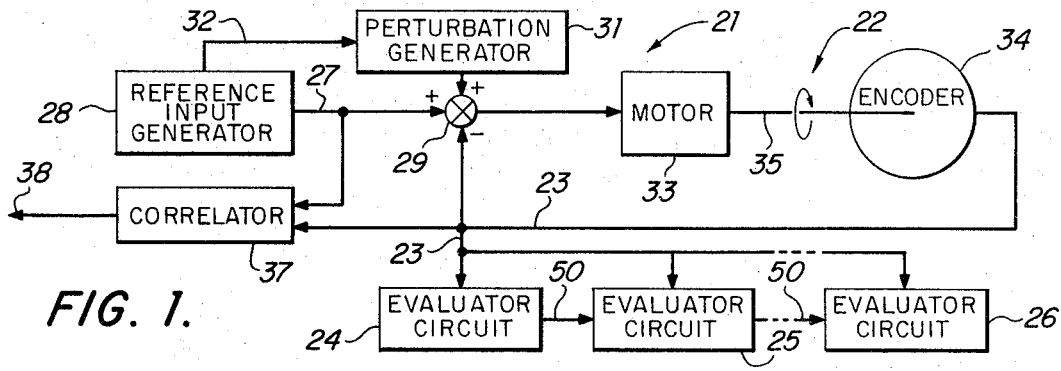
FIG. 1 is a block diagram of a preferred embodiment of the invention.

Referring first to FIG. 1 there is shown a block diagram of a preferred embodiment of an encoder error evaluation system 21 including a phase-lock servo system 22, an output of which is connected by a line 23 to a plurality of evaluation circuits 24, 25....26. The evaluation circuit 24 is described in detail below. In practice, there need only be one evaluation circuit 24, but more rapid and accurate evaluation is possible with a plurality of additional evaluation circuits 25....26.

The servo 22 is responsive to a reference input signal that is carried by a line 27 from a reference input generator 28. The reference input generator 28 is a highly stable and accurate crystal oscillator operating at a relatively high frequency, for example 10 megahertz. The reference input signal is applied to the servo 22 through a summing junction 29. Also connected to the summing junction 29 is a perturbation generator 31 that is synchronized to the reference input generator 28 through a line 32. The output of the summing junction 29 is connected to a servo motor 33 which rotates an encoder 34 under test on a shaft 35. The speed of the servo motor 33 is controlled by the output of the summing junction 29. The encoder 34 provides an output to the line 23, which is negatively added to the summing junction 29, thereby completing the feedback loop of the servo system 22. The lines 23 and 27 are also connected to a correlator 37 that correlates the signals on the two lines and provides a test output 38.

Figure 2:
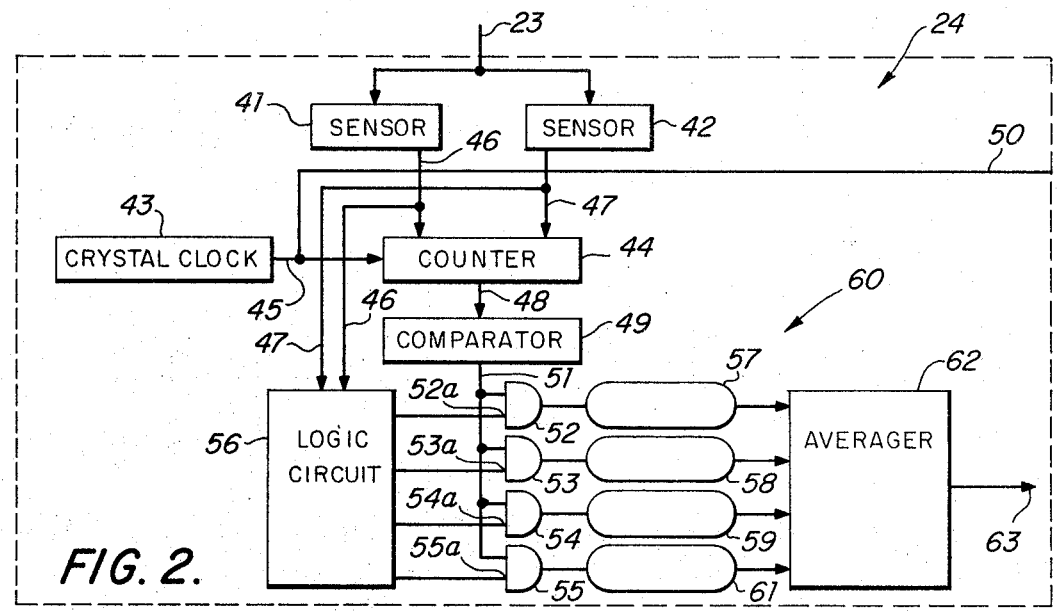
FIG. 2 is a block diagram of the detectors, clock and other data reduction components utilized in the embodiment shown in FIG. 1.

Referring next to FIG. 2, there is shown the evaluator circuit 24 in greater detail. The output line 23 is connected to a first angular position sensor 41 and a second angular position sensor 42. The angular position sensor 41 produces an output only when the encoder under test 34 is in a predetermined specific angular position. The angular position sensor 42 operates similarly except that response is to a different predetermined angular position, the responses of the two sensors 41, 42 thereby detecting an angular test segment with a magnitude of, for example, 2°. A high precision crystal oscillator 43 supplies on line 45 digital timing pulses to a counter 44 thereby establishing a measurement clock. The oscillator pulses are fed also on lines 50 into similar counters in the evaluator circuits 25....26. Signals from the sensor 41 pass through a line 46 and start the counter 44 and signals from the sensor 42 pass through line 47 and stop the counter. The output of the counter 44 is carried by a line 48 to a comparator 49 that compares the output to a predetermined theoretical value. Any difference detected by the comparator 49 is passed through a bussbar 51 to AND gates 52, 53, 54 and 55. The sensors 41 and 42 each respond once during each revolution of the encoder under test 34, and the outputs of the sensors are connected to a logic circuit 56 by the lines 46 and 47. The logic circuit 56 controls enabling inputs 52a, 53a, 54a and 55a of the AND gates 52, 53, 54 and 55, and responds to the outputs of sensors 41 and 42 so that the AND gates are enabled sequentially. That is, the AND gate 52 is enabled to pass the difference detected by the comparator 49 during the first revolution of the encoder under test 34 and AND gate 53 is enabled to pass the difference detected during the second revolution and so on. The differences pass through the AND gates 52, 53, 54 and 55 to an integrator 60 where they are registered in corresponding digital registers 57, 58, 59 and 61 respectively, and then pass to an averager 62. The averager difference detected by the comparator 49 is computed by the averager 62 and delivered at an output 63. The form and significance of the output signal available at the output 63 will be explained below.

During operation of embodiment 21 the output of the perturbation generator 31 is normally set to zero and the reference input generator 28 produces a highly stable reference input signal. The speed of the shaft 35 is therefore held constant and regulated by the reference input generator 28, subject only to minor torque variations and variations of a compensatory nature from the feedback loop carried to the summing junction 29 by the line 23. The complete output signal on the line 23 represents the shaft angle of the shaft 35 and the encoder 34 as indicated by the calibrations on the encoder, and is in the form of binary words that are used by evaluation circuits 24, 25....26, but only the least significant bits of which are passed through summing junction 29, and that is in the form of periodic pulses. The reference input on the line 27 is also in the form of periodic pulses and is of the same frequency as the least significant bit output of the encoder. A phase comparison of the two signals is made in the summing junction 29 and if they are in phase the signal passed to motor 33 maintains the motor at its current speed. When the phase angle of the output is leading the phase angle of the reference input, the summing junction 29 passes a signal that reduces the speed of the motor 33 thereby retarding the phase of the output, and when the output lags, the summing junction passes a signal that increases the speed of the motor. Thus, the servo system stays in phase with the reference input, speed control is accurate to the accuracy of the reference input and temporary perturbations due to minor torque variations are compensated for. However, small errors in the calibration of the encoder 34 that the system 21 is to detect will also cause a phase shift in the output and therefore a phse discrepancy at the summing junction 29. The servo system 22 should not follow these phase differences or the very errors sought to be detected will be masked. Calibration errors of the encoder 34 cause high frequency correction signals, but error correction signals due to improper speed of the motor 33 are of a low frequency. The motor 33 and the shaft 35 are designed with very high inertia and will change speed only in response to low frequency error signals, therefore the servo system 22 will not respond to high frequency components in the output signal due to calibration error, but will correct for errors due to improper motor speed. The output signal on line 23 therefore includes all errors due to encoder calibration.

Referring now to FIG. 2 there is shown a block diagram of the evaluation circuit 24 wherein the whole word position signals on the line 23 are applied to the angular position sensors 41 and 42. Each sensor 41, 42 is preselected to be responsive to a different word, or angular position of the encoder 34, and each sensor is activated only when the associated encoder word is equal to the preselected position word. When the counter 44 receives a pulse from the sensor 41 on the line 46 all information stored in the counter is cleared and counting of the digital timing pulses from the crystal clock 43 begins. When the encoder 34 has traversed the angular test segment and the counter 44 receives a pulse on the line 47 from the sensor 42 the counting stops, and the count, representing the time taken to traverse the angular test segment, appears on line 48. Since the angular velocity of the shaft 35 and hence of the encoder 34 is known and the counting frequency of the crystal clocks 43 is known and highly stable, the size of the angular test segment can readily be determined from the count available on the line 48. Although the count available on the line 48 contains the error information sought, it may be convenient to provide further data reduction automatically, and this is done with the remaining optional components of the evaluation circuit 24. In the comparator 49 a comparison is made with the expected theoretical value of the count and the output on line 51 represents the difference between the actual count measured and the theoretical count. The comparator 49 is optional and only reduces the count from a large number (perhaps of the magnitude of $10^5$) to a difference between actual and theoretical, which is several orders of magnitude lower and hence easier to work with. The common buss 51 takes the difference from the comparator 49 to the AND gates 52, 53, 54 and 55. The logic circuit 56 is responsive to the pulses on the lines 46 and 47 and sequentially enables the AND gates 52, 53, 54 and 55 so that the difference obtained from the comparator 49 during the dirst 360° revolution of the encoder 34 is stored in the digital reigster 57 and the difference obtained during the second revolution is stored in the digital register 58 and so on. The information in the digital registers 57, 58, 59 and 61 is fed into the averager 62 and averaged, and the average difference is available at the output 63. The error, in terms of degrees, is a function of the input reference frequency and the crystal clock frequency, both of which are known and accurate to one part in $10^{12}$, and the average difference in terms of clock count available at the output 63. The evaulation circuit 24 therefore provides automatic averaging and integration of raw data.

Other options for data processing are available and deserve mention. The first is either the elimination of the comparator 49 or the inclusion thereof at the output 63, in which case the information obtained at the output is the same. The second is the inclusion of only one digital register 57 that records the total number of counts from a plurality of revolutions. A division operation in the averager 62 then yields an average figure. Other components may be included to calculate standard deviation if desired.

A test for improving the credibility of the system 21 will be reviewed with reference to FIG. 1. Identical signals fed into the correlator 37 would produce an output at the test output 38 of a constant level. Since the reference input signal and the output signal on the line 23 are pulse trains of the same frequency and closely in phase, a constant output will be available at the test output 38. If the servo system 22 were an ideal servo the output on the line 23 would always be identical in frequency and phase angle with the input on the line 27, that is to say if errors due to encoder calibration were detected by the summing junction 29 and compensated for by the servo, the two input signals of the correlator 37 would be identical, and the output would be at a constant level. In practice, such is not the case. The minor errors due to calibration of the encoder 34 are reflected in the output signal on line 23 and appear at the test output 38 in the form of white noise superimposed on the constant level. The long term average of the white noise component is zero since the long term average encoder error is zero but over any short time sample, the white noise component is present at the test output 38 and represents encoder error not compensated for by the servo system 22. The perturbation generator 31 is next set to produce an output of a frequency that the servo system 22 can follow. The perturbation signal must be synchronized to the reference input signal to assure that the long term average (an average taken over many revolutions of the encoder 34) of the perturbation signal will not equal zero. A synchronization signal is delivered to the perturbation generator by line 32 from the reference input generator 28. The perturbation generator 31 produces a signal similar to that produced by a sustained phase difference caused by a change of speed, and if the servo system 22 will follow the perturbation produced by the perturbation generator then speed control correction signals will be followed. An example of a typical perturbation signal is one that increases the speed of the motor 33 for three degrees of rotation of the encoder 34 and decreases the speed for the next three degrees and repeats this cycle 60 times during each 360° revolution of the encoder. Since the servo system 22 does follow the perturbation signal, the perturbation is reflected in the output on line 23 which, when correlated with the reference input 27 produces the output described above, that is, a constant level with a white noise component superimposed thereon; and in addition, an alternating voltage proportional to the output of the perturbation generator, thus showing that the servo system 22 does respond to error signals caused by speed variations in the motor 33. An alternate method of testing the response of the servo system 22 to the signal from the perturbation generator is a comparison of the size of a plurality of angular test segments as measured normally, and as measured with the perturbation generator on. Test segments measured during a portion of the revolution of the encoder 34 wherein the shaft speed is faster than the average speed because of the perturbation generator 31 appears smaller than when measured with the perturbation generator off. Similarly, segments through which the encoder moves more slowly appear larger. A more accurate measurement results if a plurality of revolution of the encoder are used with the perturbation generator 31 on. Since the perturbation generator 31 is synchronized to the reference input generator 28 the phase relationship remains constant during successive revolutions.

Figure 3:
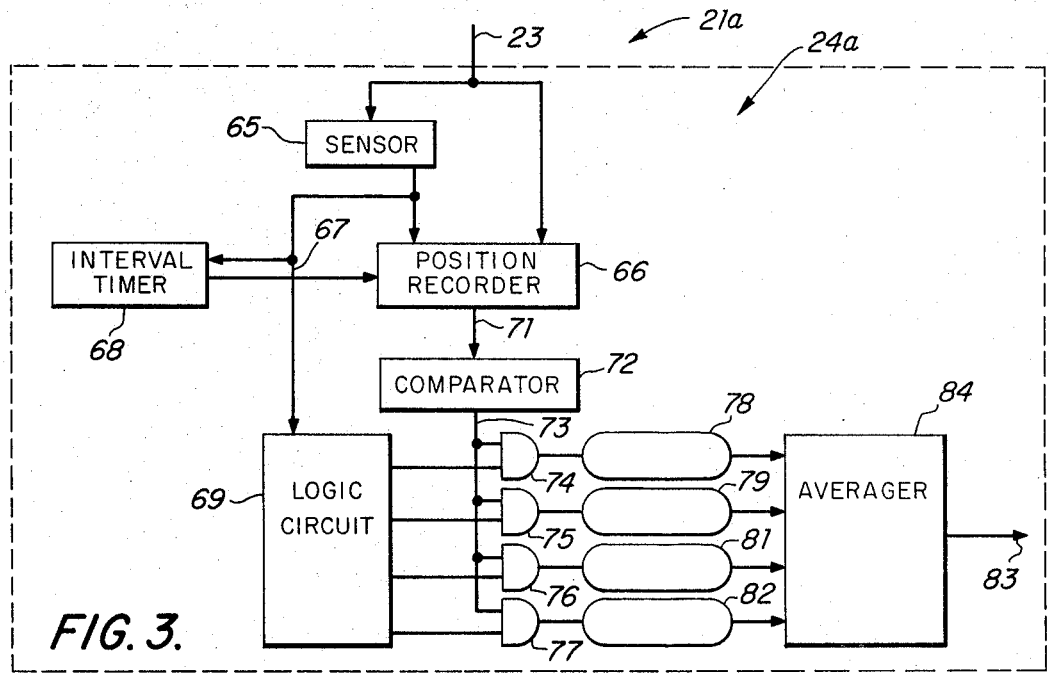
FIG. 3 is a block diagram of the sensors, timer and data reduction components utilized in an alternate embodiment of the invention.

Referring now to FIG. 3 there is shown an alternate evaluation circuit 24a for a second preferred embodiment 21a. In this embodiment 21a the servo system is the same as that represented by number 22 and depicted in FIG. 1, and the same information is available on the output line 23. The embodiment 21a, similar to the embodiment 21, may comprise one or more evaluation circuits 24a. The output signal on the line 23 is connected to both a position sensor 65 and an angular position recoder 66. The sensor 65 produces an output pulse only when one specific word representing a predetermined angular position is detected by the transducer 36, and then a pulse is produced and passed on a line 67 to the recorder 66, a crystal interval timer 68 and a logic circuit 69. An output from recorder 66 is passed by a line 71 to a comparator 72 and an output thereof is passed by a bussbar 73 to AND gates 74, 75, 76 and 77. Enabling inputs of the AND gates 74, 75, 76 and 77 are connected to the logic circuit 69, and the outputs of the gates are connected to four digital registers 78, 79, 81 and 82. An integrator 84 is responsive to the information stored in the digital registers 78, 79, 81 and 82 and produces an output at an output terminal 83.

During operation of the embodiment 21a the servo system 22 operates as described previously with respect to the embodiment 21. When the word associated with the sensor 65 appears on the line 23, an output pulse appears on the line 67 that clears the position recorder 66 of previously recorded information, starts the crystal interval timer 68 and causes the logic circuit 69 to enable the proper AND gate 74, 75, 76 or 77. Upon the expiration of the timing period the timer 68 enables the recorder 66, and the angular position of the encoder 34 as indicated by the calibrations thereon is recorded and appears on the line 71. Since the shaft speed and timing interval are accurately known, a theoretical angular position may be easily calculated and compared with the information available on the line 71. However, for averaging a plurality of runs and simplifying data reduction the following optional circuitry may be included. The measured position is compared within the comparator 72 to the theoretical position and the difference therebetween appears on the bussbar 73. As noted above, each time the recorder 66 is cleared the logic circuit 69 enables the following sequential AND gate such that the difference obtained during the first 360° revolution of the encoder 34 is passed to the digital register 78, and that difference obtained during the second revolution is passed to the digital register 79 and so on. As described previously with respect to evaluation circuit 24, a final average value is calculated in the integrator 84 and available at the output terminal 83. As with the evaluator circuit 24, the comparator may be moved to a different position within the circuit, or may be eliminated entirely, similarly many revolutions may be averaged in a single digital register 78.

Obviously, many modifications and variations of the present invention are possible in light of the above teachings. It is to be understood, therefore, that the invention can be practiced otherwise than as specifically described.

What is claimed is:

1. A system for testing for errors in an angular encoder which converts an angular position into a representative digital signal and comprising:
   a. a reference input generator means for producing a reference signal;
   b. a phase-lock servo means responsive to the reference signal, said phase-lock servo means adapted to rotate an encoder under test at a known angular velocity and including a transducer means operatively associated with the encoder under test for producing an output signal;
   c. a first sensing means operatively associated with the encoder under test for detecting a first predetermined angular position thereof;
   d. a second sensing means operatively associated with the encoder under test for detecting a second predetermined angular position thereof;
   e. a clock means operatively associated with said first sensing means and said second sensing means for measuring the time elapsed as the encoder rotates from said first predetermined angular position to said second predetermined angular position; and
   f. means for taking a plurality of readings of the time elapsed as the encoder rotates from said first predetermined angular position to said second predetermined angular position during a plurality of revolutions of the encoder to average out errors in the system unrelated to errors in the encoder.

2. An encoder evaluation system according to claim 1 including a correlator means for correlating the reference input signal and the output signal of said transducer means.

3. An encoder error evaluation system according to claim 1 wherein said servo means comprises a perturbation generator means for introducing a predetermined perturbation in the reference input signal.

4. A system as set forth in claim 1 wherein said means for taking a plurality of readings includes means for storing a plurality of values with each of said plurality of values representing the elapsed time for the encoder to rotate from said first predetermined angular position to said second predetermined angular position during a particular revolution of the encoder, whereby errors in the system unrelated to errors in the encoder are averaged out by the plurality of stored values.

5. An encoder evaluation system according to claim 4 wherein said storing means comprises a digital register means.

6. An encoder error evaluation system according to claim 5 wherein said digital register means comprises a plurality of digital registers, each responsive to the time measured by said clock means during a different one of the angular motions.

7. An encoder error evaluation system according to claim 1 wherein said means for taking a plurality of readings includes a comparator means for detecting differences between the times measured during different rotations of the encoder and a predetermined theoretical time.

8. An encoder error evaluation system according to claim 1 wherein said clock means produces a digital timing signal.

9. An encoder error evaluation system according to claim 8 wherein said clock means comprises a crystal oscillator.

10. An encoder error evaluation system according to claim 1 wherein said reference input generator means comprises a crystal oscillator.

11. An encoder error evaluation system according to claim 1 wherein:
  a. said first sensor means comprises a plurality of first sensors, each of said first sensors adapted to determine a distinct first angular position of the encoder under test;
  b. said second sensor means comprises a plurality of second sensors each of said second sensors adapted to determine a distinct second angular position of the encoder under test, and each of said second sensors being associated with a different one of said first sensors so as to establish therewith a discrete angular test segment; and
  c. said clock means comprises a plurality of separate and independent clocks, each of said clocks being operatively associated with a different one of said first sensors and adapted to measure the time elapsed as the encoder under test rotates through a different one of the discrete test segments.

12. An encoder error evaluation system according to claim 11 including a comparator means comprising a plurality of separate and independent comparator sections, each one associated with a different one of said plurality of clocks, each of said comparator sections adapted to detect differences between the time measured by a different one of said plurality of clocks and a predetermined theoretical time.

13. An encoder error evaluation system comprising:
  a. a reference input generator means for producing a reference signal;
  b. a phase-lock servo means responsive to the reference signal, said phase-lock servo means adapted to rotate an encoder under test at a known angular velocity and including a transducer means operatively associated with the encoder under test for producing an output signal;
  c. an angular sensing means operatively associated with the encoder under test for detecting a predetermined angular position thereof;
  d. a timing means operatively associated with said angular sensing means for measuring a predetermined time interval beginning when said angular sensing means detects the predetermined angular position;
  e. an angular position recorder operatively associated with said timing means for determining the angular position of the encoder under test as indicated by the output signal at the expiration of the predetermined time interval; and
  f. means for taking a plurality of readings of the angular position determined by said angular position recorder during a plurality of revolutions of the encoder to average out errors in the system unrelated to errors in the encoder.

14. An encoder error evaluation system according to claim 13 including a correlator means for correlating the reference input signal and the output signal of said transducer means.

15. An encoder error evaluation system according to claim 13 wherein said servo means comprises a perturbation generator means for introducing a predetermined perturbation in the reference input signal.

16. A system as set forth in claim 13 wherein said means for taking a plurality of readings includes means for storing a plurality of values with each of said plurality of values representing an angular position determined by said angular position recorder during a particular revolution of the encoder, whereby errors in the system unrelated to errors in the encoder are averaged out by the plurality of stored values.

17. An encoder error evaluation system according to claim 13 wherein said storing means comprises a digital register means.

18. An encoder error evaluation system according to claim 17 wherein said digital register means comprises a plurality of digital registors each responsive to the indicated positions determined by said angular position recorder during a different one of the sequential rotations of the encoder under test.

19. An encoder error evaluation system according to claim 13 wherein said means for taking a plurality of readings includes a comparator means for detecting differences between the angular positions determined during different revolutions of the encoder and a predetermined theoretical angular position.

20. An encoder error evaluation system according to claim 13 wherein said timer means produces a digital timing signal.

21. An encoder error evaluation system according to claim 20 wherein said timer means comprises a crystal oscillator.

22. An encoder error evaluation system according to claim 21 wherein said reference input generator means comprises a crystal oscillator.

* * * * *